March 10, 1953 F. F. HAUPTMAN 2,630,987
AUTOMATIC CONTROL FOR AIRCRAFT
Filed May 28, 1946 2 SHEETS—SHEET 1
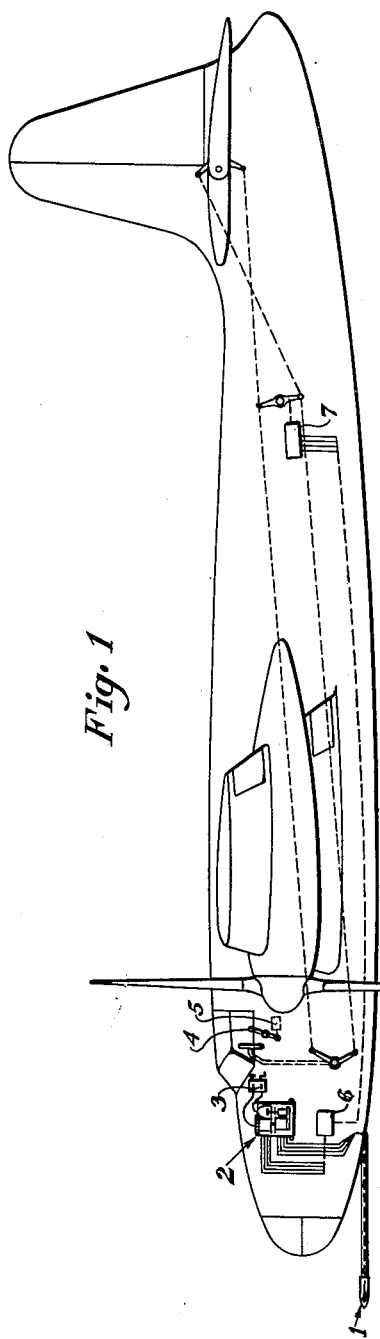
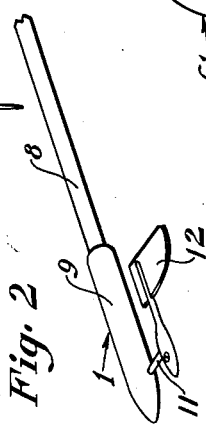
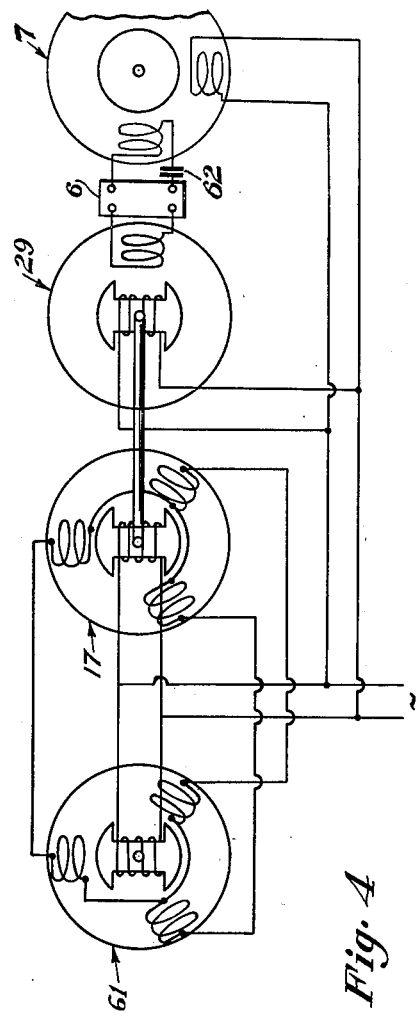
INVENTOR
FREDERIC F. HAUPTMAN
BY
*Myron J. Seibold*
ATTORNEY

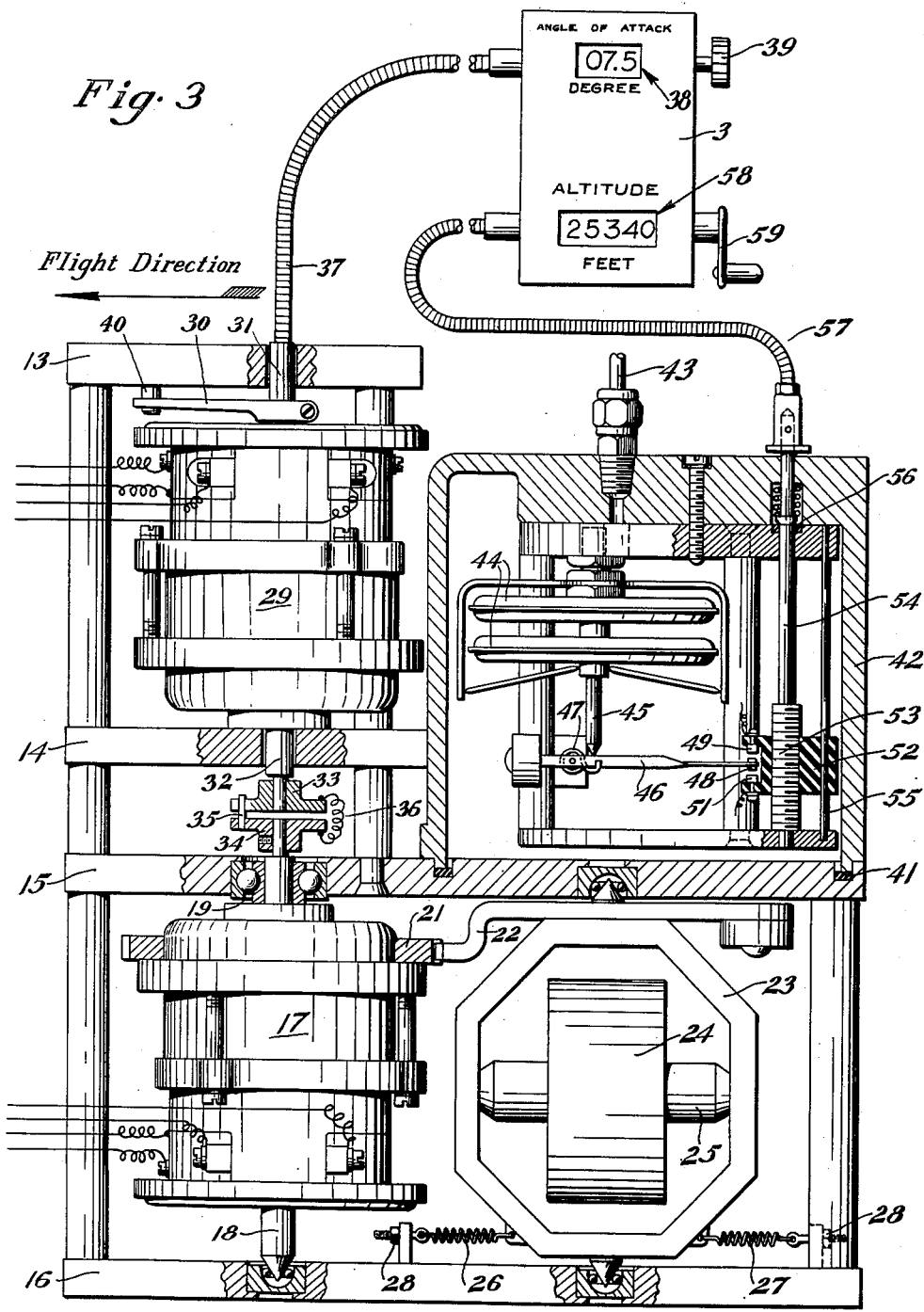

Patented Mar. 10, 1953

2,630,987

UNITED STATES PATENT OFFICE 2,630,987

AUTOMATIC CONTROL FOR AIRCRAFT

Frederic F. Hauptman, Rego Park, N. Y., assignor, by mesne assignments, to Kollsman Instrument Corporation, Elmhurst, N. Y., a corporation of New York Application May 28, 1946, Serial No. 672,740

4 Claims. (Cl. 244—77)

This invention relates to automatic controls for aircraft and has for its object the provision of apparatus for automatically controlling the elevators and throttle of an aircraft in flight.

In the operation of aircraft, particularly on long flights, it is desired to provide automatic controls to relieve the pilot from the fatiguing attention which he must otherwise give to the controlling elements of the plane to maintain a proper flight attitude. Two flight characteristics which it is often desirable for the pilot to remain constant are angle of attack and altitude. The fuel consumption of an aircraft in flight is directly related to its angle of attack and for economy of fuel consumption it is often desirable to fly the airplane at a constant angle of attack corresponding to this condition. Similarly other critical values of angle of attack corresponding to cruising speed, but rate of climb, etc. may be desirably maintained constant over an operational period. According to the present invention automatic controls are provided for the elevators of an airplane to maintain the angle of attack at a constant value which may be set at will by the pilot. Any variation in angle of attack from this value will be automatically corrected by the controls to return the airplane to the desired preset value. With the elevators thus automatically controlled for constant angle of attack, it is desirable to control the throttle of the airplane to maintain constant altitude. The control of this invention further incorporates automatic means to control the throttle to maintain constant altitude as well as constant angle of attack.

Another object of the invention is to provide an automatic control for the elevators of an airplane to maintain a constant angle of attack.

Another object of the invention is the provision of an automatic control for an airplane to maintain a predetermined angle of attack settable at will.

Another object of the invention is the provision of automatic control for aircraft for the elevators of an airplane responsive to angle of attack and to the precession of a gyroscope to move the elevators in opposite directions to maintain constant set angle of attack.

Another object of the invention is the provision of a combined automatic control for aircraft automatically maintaining a constant angle of attack and constant altitude.

Another object of the invention is the provision of an automatic thrust control for aircraft to maintain constant a predetermined set altitude.

Another object of the invention is the provision of automatic means responsive to variation from a set altitude for controlling the throttle of an airplane to vary the thrust and effect return to the set altitude thereby.

Other objects and features of the invention will be readily apparent to those skilled in the art from the specification and appended drawings illustrating certain preferred embodiments in which:

Figure 1 is a diagrammatic representation of the application of the controls of the present invention to an airplane.

Figure 2 is a detailed perspective view of the angle of attack responsive portion of the control.

Figure 3 is a view partly in section and partly in elevation of the setting and responsive portions of the control.

Figure 4 is a wiring diagram of the control elements for the elevators.

In the representation of Figure 1, there is diagrammatically illustrated the application of the automatic control of this invention to an airplane having conventional control elements. There is shown an angle of attack responsive means 1 mounted in the air stream and electrically connected to the control unit 2 shown in detail in Figure 3. At 3 is represented the setting means by which the pilot determines the altitude and angle of attack at which the airplane is to fly. The throttle for the aircraft motor is represented at 4 and at 5 is diagrammatically shown a servomotor connected to vary the position of the throttle 4 in accordance with the altitude switch of the unit 2. The elevator control output of the unit 2 is amplified by the amplifier 6 and controls the energization of a servomotor 7 connected to the elevator control cables to effect actuation of the elevators in opposite directions.

The angle of attack responsive means 1 shown in Figure 2 comprises a hollow supporting tube 8 carrying a body portion 9 from which extends a rotating shaft 11 carrying a wind vane 12. Within the body portion 9 is disposed a self-synchronous transmitter of conventional form having its rotor movable by rotation of the shaft 11 in response to variation in the change in position of the vane 12. The vane will have its plane disposed parallel to the air stream at all times so that change in its position relative to the stationary body portion 9 corresponds to change in the angle of attack of the airplane. The circuit wiring from the self-synchronous transmitter within the body portion 9 leads through the hollow tube 8 to the control unit 2.

The control unit 2 shown in Figure 3 is comprised of a plurality of supporting platforms 13, 14, 15 and 16 rigidly connected together in spaced relation by suitable supporting posts. Between the platforms 15 and 16 is mounted a self-synchronous receiver 17 supported solely by the rotor shaft ends 18 and 19 in suitable bearings so that both the rotor and what is normally the stator are rotatable. Mounted on the body of the stator of the self-synchronous receiver 17 is a gear ring 21 with which meshes a gear sector 22 rigidly mounted upon a frame 23 pivoted in the platforms 15 and 16 for rotation about the Z axis of the airplane. Within the frame 23 is disposed a gyroscope wheel 24 mounted on a shaft 25 pivoted in the frame 23 so that the axis of rotation of the gyro wheel is normally parallel to the X axis of the airplane. The gyro wheel may be rotated by any conventional air or electrical means, not shown. The frame 23 is biased into a normal position with its plane parallel to the X axis of the airplane by means of springs 26 and 27 whose tension is adjustable by means of the nuts 28.

For proper functioning of the control, it is desired that for a given rotation of the airplane about its Y axis the rotation of the stator of receiver 17 caused by precession movement of the gyroscope be greater than the rotation of the rotor of the receiver occasioned solely by the change in the angle of attack. The amount of the precessional movement of the gyro is adjustable for individual airplanes by adjusting the tension of springs 26 and 27 or by varying the speed of rotation of the gyro wheel.

Between the platforms 13 and 14 is mounted a rotatable transformer 29 supported by its rotor shaft 32 journalled in the platform 14 and by a shaft 31 rigidly connected to the stator and journalled in the platform 13 so that what is normally the stator of the transformer, as well as the rotor, is rotatable. The shafts of the rotor of the self-synchronous receiver 17 and of the rotor of the rotary transformer 29 are rigidly connected together for common movement by a pair of connector elements 33 and 34 having a pin and slot connection at 35 and provided with an electrical jumper at 36 to insure grounding connection. A flexible drive shaft 37 is connected to the shaft 31 rigid with the stator of the transformer 29 and is connected through an indicating counter 38 in the setting unit 3 to a manual adjusting knob 39 so that rotation of the knob 39 effects rotation of the stator of the transformer 29.

To prevent the pilot inadvertently setting an angle of attack so high as to cause stalling of the aircraft, an arm 30 is adjustably mounted on the shaft 31 and cooperates with a limiting stop 40 on the platform 13. The adjusted position of the arm 30 on the shaft 31 will determine the maximum angle of attack which can be set on the instrument by limiting the rotation of the stator of transformer 29.

Mounted upon the platform 15 in sealed relation by engagement with the sealing ring 41 is a chamber 42 adapted to be connected to the static line 43 of a pitot static tube so that the interior of chamber 42 is at the barometric pressure of the atmosphere in which the airplane is traveling. Within the chamber 42 are mounted a pair of diaphragm capsules 44 upon which is mounted a pin 45 bearing against a switching arm 46 biased by spring 47 in a counterclockwise direction, the spring 47 also serving as an electrical connection to the switching arm. The switching arm 46 carries a double faced contact 48 cooperating with a pair of spaced stationary contacts 49 and 51 mounted upon an insulating block 52 having a screw thread connection at 53 with a setting shaft 54. The insulating block 52 is guided in its reciprocating movement by the rod 55. The setting shaft 54 extends through a reel 56 to the exterior of the casing 42 and is connected to a flexible shaft 57 which passes through a counter 58 to an operating crank 59 so that by manipulation of the crank 59 the pilot can vary the position of the contacts 49 and 51 to determine the altitude to be maintained.

The electrical circuit for the altitude control is a conventional reversing circuit for movement of the servomotor 5 in opposite directions depending on whether the contact 48 is engaged with stationary contact 49 or stationary contact 51. When the contact 48 is in the mid position, the servomotor 5 is de-energized to maintain the throttle position constant.

The wiring diagram for the automatic elevator control is shown in Figure 4 where the self-synchronous transmitter operated by the vane 12 is indicated at 61. The single phase rotor windings of the self-synchronous transmitter 61 and self-synchronous receiver 17 are energized from an alternating current source and their three phase stator windings are interconnected so that the rotor of the receiver 17 follows in position the movements of the rotor of the transmitter but modified by the movement of the stator of the receiver 17. Or, in other words, if the stator remained stationary, the movement of the rotor of the receiver would exactly correspond to the movement of the transmitter, but with movement of the stator of the receiver, the rotor of the receiver will move through an angle which is the algebraic sum of the movements of the transmitter rotor and the receiver stator. The rotary transformer 29 has its rotor nomally at a null position in which no voltage is generated in its output winding. Rotation of the transformer rotor out of the null point induces a voltage in its output winding whose value is determined by the angle of rotation of the rotor and whose phase relation is determined by the side of the null point to which the rotor is moved, the voltages at the opposite sides of the null point being reversed 180° in time phase. The output winding of the rotary transformer 29 feeds through a condenser 62 one phase of the two phase winding of the servomotor 6, the other phase of which is fed from the alternating current source. The rotors of the self-synchronous receiver 17 and of the rotary transformer 29 are mechanically connected so that the transformer rotor follows the position of the rotor of the self-synchronous receiver.

The operation of the control is described in connection with an operational movement of an airplane. The pilot sets the desired angle of attack and the desired altitude at the counters 38 and 58 by manipulation of the knob 39 and crank 59. It is assumed that the airplane is flying in level flight at the set angle of attack and at the set altitude when an up-draft or gust under the wings tends to pitch it upwardly in a turning movement about the Y axis. This effects an angular movement of the vane 12 with respect to the X axis of the airplane which is reflected in a rotation of the rotors of the self-synchronous transmitter 61 and receiver 17. At the same time the turning of the airplane about the Y axis causes a precession movement of the gyroscope which through sector 22 and ring gear 21 effects rotation of the stator of the receiver 17 in the same direction as the rotor rotation. This stator rotation results in a further rotation of the receiver rotor so that the initial corrective response as reflected in the rotation of the transformer rotor is directly additive. Rotation of the rotor of the receiver 17 rotates the rotor of the transformer 29 out of its null point and causes a voltage to be generated within the output winding of the transformer. This energizes the servomotor 6 for rotation to apply a relatively rapid corrective movement to the elevators of the airplane. As soon as the airplane starts to correct its position by a return rotation about the Y axis, the gyroscope precesses in the opposite direction to rotate the stator of the receiver 17. Rotation of the stator effects a corresponding and equal rotation of the rotor of the receiver from its corrective position and as the rotation of the stator caused by the gyroscope is greater than the rotation of the rotor effected by the angle of attack vane the rotor of the transformer 29 will be moved to the opposite side of its null point to energize the servomotor 6 in the opposite direction to initiate return of the elevators to their normal position. Here, however, the angle of rotation of the transformer motor is the differential of the rotations of the receiver rotor and stator so that the energization of the servomotor is lowered and the return of the elevators is carried out at reduced speed. As the airplane approaches its pre-set position, this servomotor energization becomes progressively less and when the airplane is in its pre-set position the elevators should be returned to their normal position with the transformer rotor at its null point. In the event overshooting should occur by an over correction, the control will operate in the same manner as in an initial correction to return the airplane to its pre-set position.

During the maneuvers occasioned by the elevator change to maintain angle of attack, the airplane will not maintain a constant altitude if the throttle condition is constant. However, the altitude correction of the control of this invention automatically takes care of this condition since upon change in altitude the position of the aneroid capsules 44 changes to move the movable contact 48 into engagement with the proper stationary contact 49 or 51 to energize the servomotor 5 for rotation in the proper direction to change the setting of the throttle 4 to maintain the constant altitude pre-set by the pilot on the counter 58.

Further explanatory of the operation of the control, assume that flying under the set conditions the angle of attack setting is purposely changed. This rotates the stator of the rotary transformer 29 to energize the servomotor 6 to move the elevators in the proper direction to direct the airplane toward the new angle of attack. As soon as the airplane starts turning about its Y axis, the gyroscope precesses to rotate the stator of the receiver 17, and hence its rotor, to effect rotation of the rotor of the transformer 29 to the opposite side of its null point a distance which is the differential between the rotation of the stator of transformer 29 and the stator of receiver 17. This energizes the servomotor 6 in the opposite direction to effect a return of the elevators to their normal position which should be effected when the angle of attack corresponds to the set value. If under- or over-shooting occurs in this operation, the control will effect an additional correction until the proper condition is met.

The X, Y and Z aircraft axes referred to in this specification and the appended claims are in accordance with the aerodynamic symbols adopted by the National Advisory Committee for Aeronautics in which the X is the longitudinal axis of the aircraft, the Y is the lateral axis of the aircraft, and the Z is the normal axis of the aircraft.

While the altitude control has been specifically disclosed as applied to the throttle of the aircraft, it will be understood that any means for influencing thrust may be controlled by the altitude control, the throttle ordinarily being the simplest element.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In a control system for automatically moving the elevators of an airplane to maintain a constant angle of attack, means responsive to the angle of attack at which the airplane is flying, a gyroscope normally rotating in a plane parallel to the Y and Z axes of the airplane, means biasing the gyroscope to rotate in its normal position, rotation of the airplane about the Y axis being accompanied by precession movement of the gyroscope, a servomotor for effecting movement of the elevators in opposite directions, an electrical control for said servomotor including independently rotatable windings the relative position of which determines the direction and speed of movement of said servomotor, means energizing one of said windings from an alternating current source, means energizing said servomotor from the other of said windings, means for manually rotating one of said windings to set the constant angle of attack at which the airplane is to operate, and means for rotating the other of said windings in response to the algebraic sum of the movements of said first mentioned means and gyroscope.

2. In a control system for automatically moving the elevators of an airplane to maintain a constant angle of attack, means responsive to the angle of attack at which the airplane is flying, a gyroscope normally rotating in a plane parallel to the Y and Z axes of the airplane, means biasing the gyroscope to rotate in its normal position, rotation of the airplane about the Y axis being accompanied by precession movement of the gyroscope, a servomotor for effecting movement of the elevators in opposite directions, a rotary transformer energizing said servomotor, a self-synchronous receiver controlling the position of said rotary transformer, a self-synchronous transmitter controlled by said first mentioned means, means interconnecting said transmitter and receiver so that the rotor of the receiver moves in response to movement of said first mentioned means, and means connecting said gyroscope to the stator of said receiver to effect rotation thereof upon precession movement of the gyroscope whereby the position of the rotary transformer and the receiver rotor is determined by the algebraic sum of the movements of said first mentioned means and gyroscope.

3. In a control system for automatically moving the elevators of an airplane to maintain a constant angle of attack, means responsive to the angle of attack at which the airplane is flying, a gyroscope normally rotating in a plane parallel to the Y and Z axes of the airplane, means biasing the gyroscope to rotate in its normal position, rotation of the airplane about the Y axis being accompanied by precession movement of the gyroscope, a servomotor for effecting movement of the elevators in opposite directions, a rotary transformer having relatively rotatable windings, means for energizing one of the windings of said rotary transformer from an alternating current source, means for energizing said servomotor from the other of said transformer windings, said transformer windings having a null position and energizing the servomotor for rotation in opposite directions when disposed at opposite sides of said null position, manual means for rotating one of the windings of said transformer to set the angle of attack at which the airplane is to operate, a self-synchronous receiver having its rotor connected to rotate the non-set transformer winding, and means controlled by said first mentioned means and by said gyroscope for determining the position of said receiver rotor.

4. In a control system for automatically moving the elevators of an airplane to maintain a constant angle of attack, means responsive to the angle of attack at which the airplane is flying, a gyroscope normally rotating in a plane parallel to the Y and Z axes of the airplane, means biasing the gyroscope to rotate in its normal position, rotation of the airplane about the Y axis being accompanied by precession movement of the gyroscope, a servomotor for effecting movement of the elevators in opposite directions, a self-synchronous transmitter controlled by said first mentioned means, means interconnecting said transmitter and receiver so that the rotor of the receiver moves in response to movement of said first mentioned means, and means connecting said gyroscope to the stator of said receiver to effect rotation thereof upon precession movement of the gyroscope whereby the position of the non-set transformer winding and receiver rotor is determined by the algebraic sum of the movements of said first mentioned means and gyroscope.

FREDERIC F. HAUPTMAN.

REFERENCES CITED

The following references are of record in the file of this patent:

UNITED STATES PATENTS

| Number | Name | Date |
|---|---|---|
| 1,351,538 | Reynolds | Aug. 31, 1920 |
| 1,443,982 | Endenn | Feb. 6, 1923 |
| 1,816,688 | McCarroll | July 28, 1931 |
| 2,014,965 | Fischel | Sept. 17, 1935 |
| 2,104,627 | Manteuffel | Jan. 4, 1938 |
| 2,110,622 | Fischel | Mar. 8, 1938 |
| 2,191,250 | Fischel | Feb. 20, 1940 |
| 2,323,311 | Crane et al. | July 6, 1943 |
| 2,343,288 | Fink | Mar. 7, 1944 |